(12) United States Patent
Wang et al.

(10) Patent No.: US 12,219,895 B2
(45) Date of Patent: Feb. 11, 2025

(54) PRECISION SEEDING APPARATUS WITH RECESSES ON CATERPILLAR FOR ARRANGING AND DISTRIBUTING SEEDS AGAINST BOTTOMS OF SEED FURROWS

(71) Applicants: Northwest A & F University, Xianyang (CN); Beijing Guanghui Caizhi Management Consulting Co., Ltd., Beijing (CN)

(72) Inventors: Dong Wang, Xianyang (CN); Wensheng Tian, Xianyang (CN)

(73) Assignees: Northwest A & F University, Xianyang (CN); Beijing Guanghui Caizhi Management Consulting Co., Ltd., Beijing (CN)

( * ) Notice: Subject to any disclaimer, the term of this patent is extended or adjusted under 35 U.S.C. 154(b) by 623 days.

(21) Appl. No.: 17/666,597

(22) Filed: Feb. 8, 2022

(65) Prior Publication Data

US 2022/0248595 A1   Aug. 11, 2022

(30) Foreign Application Priority Data

Feb. 11, 2021  (CN) .......................... 202110185746.4

(51) Int. Cl.
*A01C 7/16*       (2006.01)
*A01C 7/20*       (2006.01)

(52) U.S. Cl.
CPC .............. *A01C 7/16* (2013.01); *A01C 7/208* (2013.01)

(58) Field of Classification Search
CPC .. A01C 7/12; A01C 7/127; A01C 7/16; A01C 7/20; A01C 7/201; A01C 7/208
See application file for complete search history.

(56) References Cited

U.S. PATENT DOCUMENTS

| 1,617 A | * | 5/1840 | Page | A01C 7/04 111/71 |
| 2008/0250993 A1 | * | 10/2008 | Mariman et al. | A01C 7/046 111/167 |
| 2010/0192818 A1 | * | 8/2010 | Garner et al. | A01C 7/20 111/11 |

FOREIGN PATENT DOCUMENTS

| KR | 100242969 B1 | * | 2/2000 |
| WO | WO-8101352 A1 | * | 5/1981 |

OTHER PUBLICATIONS

Machine translation of Lee, Yung Mun, KR 100242969 B1. (Year: 2000).*

* cited by examiner

*Primary Examiner* — Tara Mayo
(74) *Attorney, Agent, or Firm* — Gearhart Law, LLC

(57) ABSTRACT

The present disclosure relates to a precision seeding apparatus with recesses on a caterpillar for arranging and distributing seeds against bottoms of seed furrows. The apparatus includes a frame; the frame is provided with a seed box with a seed distribution opening; a caterpillar for transporting seeds capable of being connected with a drive mechanism is arranged in the seed box; a lower part of the caterpillar for transporting seeds corresponds to the position of the seed distribution opening; the caterpillar is provided with at least one column of recesses in a lengthwise direction of the caterpillar; each group of recesses is connected through a seed unloading ditch; the seed unloading ditch is formed into a ring in a lengthwise direction of the caterpillar for transporting seeds; a lower part of the caterpillar for transporting seeds is provided with a comb sheet.

18 Claims, 4 Drawing Sheets

PRECISION SEEDING APPARATUS WITH RECESSES ON CATERPILLAR FOR ARRANGING AND DISTRIBUTING SEEDS AGAINST BOTTOMS OF SEED FURROWS

CROSS REFERENCE TO RELATED APPLICATION(S)

This patent application claims the benefit and priority of Chinese Patent Application No. 202110185746.4, filed on Feb. 11, 2021, the disclosure of which is incorporated by reference herein in its entirety as part of the present application.

TECHNICAL FIELD

The present disclosure relates to a precision seeding apparatus with recesses on a caterpillar for arranging and distributing seeds against bottoms of seed furrows, and belongs to the field of agricultural machinery and equipment, which is applicable to one-ditch single-row single-grain spaced sowing or one-ditch multi-row single-grain spaced sowing of seeds of crops such as wheat, corn, soybean, and peanut.

BACKGROUND ART

In traditional grain seeding machinery, for wheat and the like, an outer grooved wheel seed apparatus is often used. A seeding amount is controlled by a seeding apparatus. After seeds are discharged from the seeding apparatus, the seeds are transported to a furrow opener through a seed tube and are then randomly scattered in seed furrows. This mechanical design separates the seeding apparatus from the furrow opener and separates a seed metering process from a seed distribution process. Although the seeding amount can be controlled more accurately, the spatial distribution of seedlings cannot be precisely controlled, and it is difficult to achieve precise seeding. A finger-clip type seeding apparatus is used on corn and other crops, which has a single-grain spaced sowing function and can accurately control the seeding amount and also accurately control a seed row spacing. However, under the restriction of the mechanical design, it is difficult to meet a design requirement for one-ditch multi-row single-grain spaced sowing of small seeds.

SUMMARY

The present disclosure aims to provide a precision seeding apparatus with recesses on a caterpillar for arranging and distributing seeds against bottoms of seed furrows for the defects of the existing art, which can realize one-ditch one-row single-grain spaced sowing of large seeds and one-ditch multi-row single-grain spaced sowing of small seeds.

The technical solution of the present disclosure includes a frame; the frame is provided with a seed box with a seed distribution opening; a caterpillar for transporting seeds capable of being connected with a drive mechanism is arranged in the seed box; a lower part of the caterpillar for transporting seeds corresponds to the position of the seed distribution opening; the caterpillar is provided with at least one column of recesses in a lengthwise direction of the caterpillar; each group of recesses is connected through a seed unloading ditch; the seed unloading ditch is formed into a ring in a lengthwise direction of the caterpillar for transporting seeds; the recess has a width greater than that of the seed unloading ditch and has the same depth as that of the seed unloading ditch; a lower part of the caterpillar for transporting seeds is provided with a comb sheet; and one edge of the comb sheet away from the seed unloading ditch is fixed on a rear wallboard of the seed box.

Further, the frame is provided with a supplementary seed box, and a supplementary seed tube at a lower end of the supplementary seed box is led to a lower part of a downstream side of the caterpillar.

Further, the supplementary seed box is located in the seed box, and an opening in an upper end of the supplementary seed box is located in the middle or lower part of the seed box.

Further, a light reflection sheet is arranged at a lower bottom of each recess, and a corresponding photoelectric sensor is provided below the supplementary seed tube.

Further, a seed clearing brush contacting a surface of the caterpillar is arranged above or below the supplementary seed tube.

Further, the supplementary seed box and the caterpillar are arranged on two sides of the lower part of the seed box, and the caterpillar is inclined towards the seed distribution opening.

Further, in two adjacent columns of recesses, a center point of any one recess in one column corresponds to a middle point of a gap between two adjacent recesses in the other column.

Further, the bottom surface of each recess is an arc-shaped surface, and an outer edge is circular or elliptical or track-shaped.

Further, one group of supplementary seed tubes is connected with the supplementary seed box; the number of supplementary seed tubes is the same as the number of columns of recesses; and an opening in a lower end of each supplementary seed tube corresponds to the position of one column of recesses, and is spaced away from the outer surface of the caterpillar by a distance that is half of the depth of the recess.

Further, the lower end of the frame is provided with a disk furrow opener; the seed distribution opening is located behind the furrow opener and is located between two disks of the furrow opener; and a rotating shaft of a drive wheel of the seeding machinery is connected with a driving wheel of the caterpillar for transporting seeds through a transmission mechanism.

The present disclosure has the following beneficial effects:

1. The present disclosure overturns the seeding and seed distribution methods of a traditional crop seeding machinery, and changes the method of seeding first and then seed distribution into a method of simultaneously realizing seeding and seed distribution; the seeding apparatus and the furrow opener are connected into a whole; a seed metering process and a seed distribution process are combined, so that the seeding amount can be accurately controlled, and the spatial distribution of seedlings can also be accurately controlled.

2. In the present disclosure, the structure is specially in a ground seed distribution design, so that a distance from the recesses on the caterpillar for transporting seeds to the bottom of the seed furrows is very short, and seeds fall onto the bottom of the seed furrows fast; the seed distribution uniformity is nearly not affected by the forward velocity of the apparatus; the seeding apparatus is suitable for high-speed operation and can ensure high-quality seed distribution under the high-speed forwarding condition of the seeding machinery. Compared to the existing art, the seeding speed, the working efficiency, and the seeding uniformity of the seeding machinery are greatly improved.

2. The present disclosure adopts a special recess caterpillar for transporting seeds, which can realize one-ditch one-row single-grain spaced sowing of large seeds and one-ditch multi-row single-grain spaced sowing of small seeds; the same seeding machinery can be used to sow seeds of different crops by replacing the caterpillar for transporting seeds only, so that one apparatus has multiple purposes, thereby greatly reducing the expense of farmers in buying the seeding machinery, saving social resources, reducing the planting cost of crops, and significantly enhancing the planting benefit of the farmers.

3. In the present disclosure, by the recess design, when seeds are quantitatively transported at fixed distances, the seeds are also protected. Meanwhile, the caterpillar for transporting seeds may be made of a rubber material, so that it is soft and anti-wear to effectively avoid injury to the seeds in the seeding and seed distribution processes.

4. In the present disclosure, the inside of the recess is designed into a pan bottom shape; the depth from the edge of the recess to the bottommost part of the recess gradually increases; the maximum depth is consistent with the thickness of a seed to be sowed. When the recess passes through the seed box with the movement of the caterpillar for transporting seeds, it is easier for the seed to fall into the recess. Furthermore, under the action of a friction force of a seed unloading ditch in the center of the recess, the seed can be stably left in the recess. The seed falling to the bottom of the recess is gradually embedded in the recess in a lying form after colliding with and frictionizing surrounding seeds. When passing through the seed clearing brush, under the brushing action of the seed clearing brush, the surrounding seeds are easily removed from the recess, so that each recess only accommodate one seed located at the ditch bottom of the recess.

5. In the present disclosure, an auxiliary seeding apparatus is designed; two seed sorting processes and one regular seed supplementation process are set from the seed box to the seed distribution opening. When the caterpillar for transporting seeds moves through the seed box, the seed falls into the recess under the action of the gravity. When the caterpillar for transporting seeds passes through the seed clearing brush II, almost all the seeds located outside the recess can be blocked and left in the seed box by the seed clearing brush II. When the caterpillar for transporting seeds passes through the supplementary seed tube, once there is an empty recess, the seed in the supplementary seed tube can be timely supplemented into the empty recess under the action of the gravity, which significantly reduces the no-load ratio of the recess. The seed clearing brush I is mounted behind the seeding apparatus. On the one hand, it plays a role of shielding the seed in the recess and avoids the seed from being separated from the recess too early; and on the other hand, it is used as a second barrier to effectively avoid excess seeds from passing through. By the above structure, the single-grain seeding rate of this invention is up to 98% or above.

6. In the present disclosure, the light reflection sheet is arranged in the center of the bottom of the recess of the caterpillar for transporting seeds. A no-load and miss-seeding monitoring function can be realized through the reflective photoelectric sensor, which effectively solves the problem that it is hard for an ordinary bijection photoelectric sensor to monitor multiple columns of objects that move in parallel.

Figure 1:
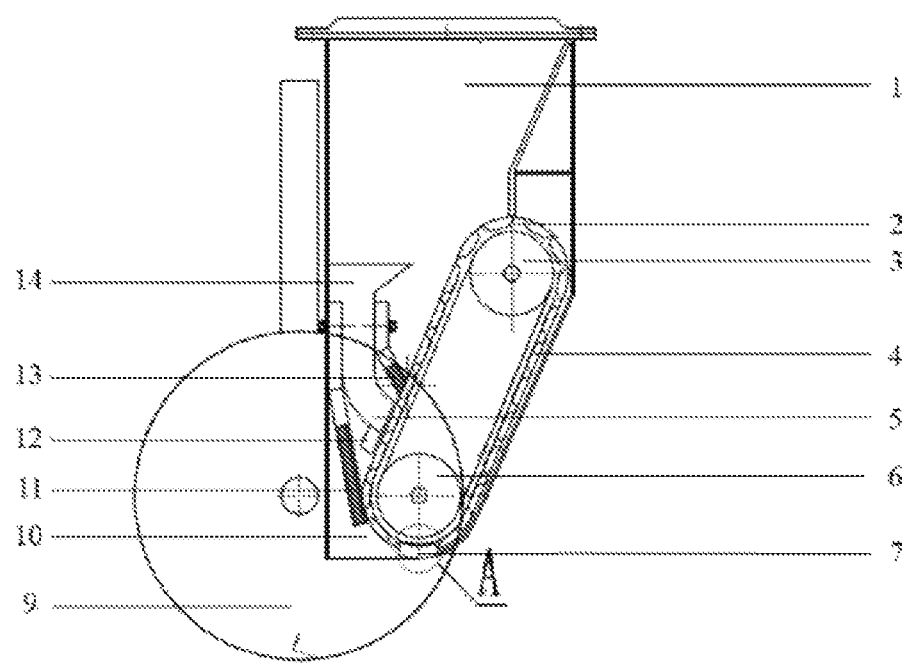
FIG. 1 is a structural diagram of an embodiment of the present disclosure.

In the drawings: 1: seed box; 2; caterpillar for transporting seeds; 3: driving wheel; 4: recess; 5: supplementary seed tube; 6: driven wheel; 7: seed unloading comb; 8: comb sheet; 9: disk furrow opener; 10: seed distribution opening; 11: second seed clearing brush; 12: reflective photoelectric sensor; 13: first seed clearing brush; 14: supplementary seed box; 15: seed unloading ditch; 16: light reflection sheet.

DETAILED DESCRIPTION OF THE EMBODIMENTS

As shown in the figures, this embodiment includes a frame; a lower end of the frame is provided with a furrow opener 9 through a shaft; a seed box 1 is mounted on the frame behind the shaft of the furrow opener 9; an upper end of the seed box 1 is a seed inlet that may be provided with an upper cover; and a lower end of the seed box 1 is provided with a seed distribution opening 10. A front wallboard of the seed box 1 close to the furrow opener 9 is a vertical upright plate, and a lower part of a rear wallboard of the seed box is gradually inclined towards the front wallboard; and the front and rear wallboards form the seed distribution opening at the lower end of the seed box. A caterpillar for transporting seeds 2 is arranged on an inner side of the inclined part of the rear wallboard. The mounting structure of the caterpillar for transporting seeds 2 is as follows: a driving shaft and a driven shaft are respectively arranged on a side wall of the seed box 1, and the driving shaft can be connected with an external drive mechanism. The driving shaft and the driven shaft are respectively provided with a driving wheel 3 and a driven wheel 6 which cooperate with the caterpillar for transporting seeds 2. The caterpillar for transporting seeds 2 of this embodiment is a ring caterpillar, an inner surface of which is provided with positioning trenches arranged in parallel. The direction of the positioning trenches is perpendicular to a running direction of the caterpillar for transporting seeds 2, so as to facilitate replacing different caterpillars according to conditions of seeds. The rear wallboard above the caterpillar for transporting seeds 2 is arranged over the caterpillar for transporting seeds, so as to ensure that the seeds are successfully guided to the seed distribution opening 10. The seed distribution opening 10 is located at a lower end of the disk furrow opener 9 and is embedded between two opening disks of the disk furrow opener 9. During use, the driving wheel of this embodiment can be connected to a walking mechanism of the seeding machinery to realize synchronous seeding, so that seeding is not affected by a running speed of the seeding machinery, and a uniform seeding effect is achieved.

Figure 2:
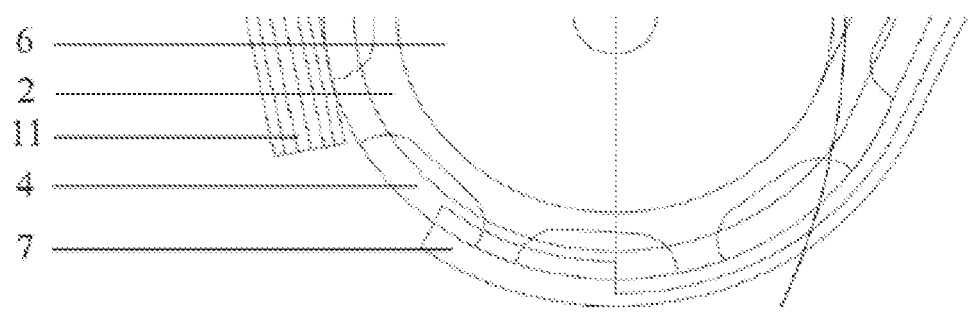
FIG. 2 is an enlarged diagram of point A in FIG. 1.
Figure 3:
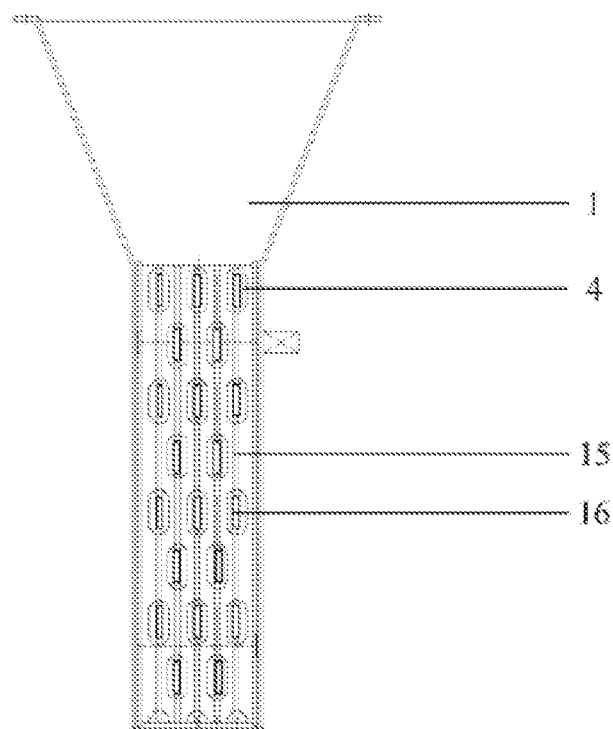
FIG. 3 is a structural diagram of a first kind of caterpillar for transporting seeds.
Figure 4:
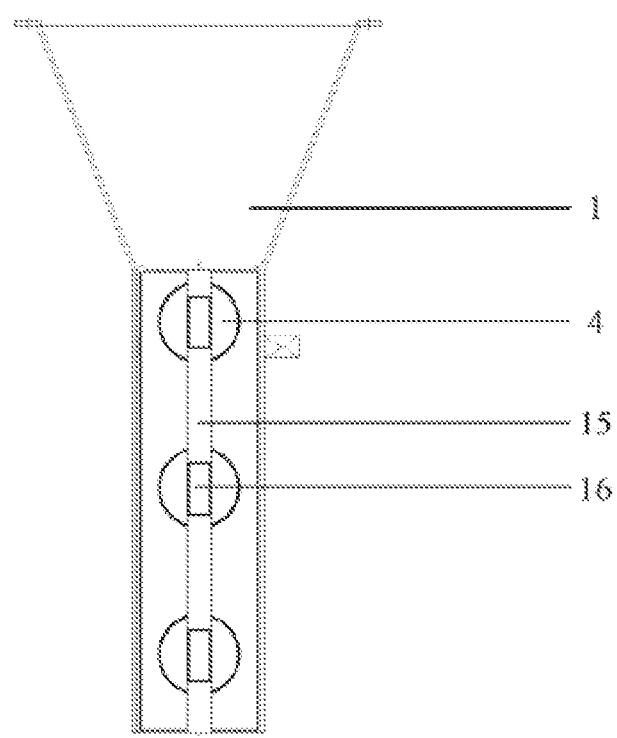
FIG. 4 is a structural diagram of a second kind of caterpillar for transporting seeds.

In this embodiment, an outer surface of the caterpillar for transporting seeds 2 is provided with recesses 4 along its moving direction. The size of each recess 4 is matched with that of each seed. For different seeds, the caterpillar for transporting seeds 2 with recesses 4 of different shapes and sizes are used to carry and convey the seeds. As shown in FIG. 2, in this embodiment, an edge of one recess 4 on the caterpillar for transporting seeds 2 is of a track shape. This caterpillar for transporting seeds 2 is applicable to wheat seeding. The edge of the recess 4 on the caterpillar for transporting seeds 2 shown in FIG. 3 is circular, and this caterpillar for transporting seeds 2 is applicable to corn seeding. The recess 4 of this embodiment may also be elliptical or of other shapes adapting to the seed.

The caterpillar for transporting seeds 2 of this embodiment is provided with at least one recess column along its moving direction. In this embodiment, five recess columns are adopted. Each recess column is composed of a group of recesses 4 disposed at a certain distance. The recesses 4 in two adjacent recess columns are staggered. That is, in two adjacent recess columns, a center point of any recess on one column corresponds to a middle point of a gap between two adjacent recesses on the other column. In this embodiment, a bottom surface of each recess 4 is arc-shaped or a plane, and the edge of the recess is connected to the bottom surface through an arc-shaped surface.

A seed unloading ditch 15 for connecting the respective recesses 4 is provided between the respective recesses 4 of the same recess column. The seed unloading ditches 15 form a closed ring in the moving direction of the caterpillar for transporting seeds 2. A width of each seed unloading ditch 15 is less than that of each recess 4. For example, an elliptical recess 4 has a long-axis length of 8 mm, a short-axis length of 4 mm, and a depth of 3 mm. A horizontal distance between the middle lines of two adjacent columns of recesses is 2 cm, and a horizontal distance between the column of recesses on the outermost side and the edge of the caterpillar is 1 cm. The width of the seed unloading ditch 15 may be 1 mm, and its ditch depth may be 3 mm. That is, the depth of the seed unloading ditch 15 is the same as that of the recess 4.

At the seed distribution opening, a seed unloading comb 7 is mounted on the rear wallboard of the seed box. The seed unloading comb 7 includes a group of comb sheets 8 extending forwards. The number and positions of the comb sheets 8 correspond to the number of positions of the seed unloading ditches 15, and the comb sheets are embedded into the seed unloading ditches 15 at the seed distribution opening 10. When the caterpillar for transporting seeds 2 rotates, once there is a seed that falls off without the action of the gravity in the recess 4, after the seed touches the comb sheets 8, the seed will be forcibly pushed out of the recess 4 for unloading and falling under the extrusion of the comb sheets 8, so as to ensure the seeding effect.

On the front wallboard of the seed box 1 in this embodiment, a supplementary seed box 14 is mounted in the seed box 1. The supplementary seed box may of a fixed structure, or may be fixed on an inner side surface of the front wallboard through a strake and a screw or a similar structure, so as to facilitate removal and replacement. An upper end of the supplementary seed box 14 is provided with an opening located in the middle or the lower part of the seed box 1. The opening in the upper end is normally opened to ensure that the seeds of the seed box 1 can directly enter the supplementary seed box 14, without adding seeds into the supplementary seed box 14 separately. An opening in a lower end of the supplementary seed box 14 is connected with a supplementary seed tube 5. The supplementary seed tube 5 may be a flat-orifice tube, a tube orifice of which corresponds to the recess column on the whole caterpillar 2. There may also be a group of supplementary seed tubes 5. The number of the supplementary seed tubes 5 is the same as the number of the recess columns, and each supplementary seed tube corresponds to the position of one recess column. A lower part of each supplementary seed tube 5 is smoothly bent towards the caterpillar for transporting seeds 2, and a lower tube orifice of each supplementary seed tube 5 directly faces the recess column on the downstream side of the caterpillar for transporting seeds 2 and is spaced away from the outer surface of the caterpillar for transporting seeds 2 by a distance that is half of the depth of each recess 4, so that the seeds for supplementation can accurately enter the recesses 4.

A second seed clearing brush 11 and a first seed clearing brush 13 are respectively arranged above and below the supplementary seed tubes 5. The first seed clearing brush 13 located above the supplementary seed tubes 5 is used for clearing away seeds that directly go down from the seed box 1 along the caterpillar for transporting seeds 2 but are not embedded into the recesses 4, and the second seed clearing brush 11 is used for further clearing away recess seeds that are not cleared by the first seed clearing brush and seeds that are discharged from the supplementary seed tube 5 and are not embedded into the recesses 4. By two stages of clearing, the grain number of sowed seeds can be ensured.

In addition, a light reflection sheet 16 or light reflection film is arranged at the bottom of each recess 4 of this embodiment. The light reflection sheet 16 or light reflection film can be fixed at the bottom of the recess 4 in a sticking manner. A reflective photoelectric sensor 12 is fixed below the lower tube orifice of each supplementary seed tube 5, so as to monitor whether the recess 4 is empty and timely supplement seeds.

The shape of the recess in the present disclosure can be designed into a circle or an ellipse or a track shape according to the shape of the seeds of a crop. The value ranges of the size and depth of the recess are not less than average values of the size and thickness of the seeds of the crop and are not greater than 95% of the maximum value. There may be several kinds of caterpillar for transporting seeds according to different recess shapes and sizes and different arrangement modes, so as to respectively adapt to sow seeds of different crops, and it is more convenient to remove and replace the caterpillar for transporting seeds from the driving wheel and the driven wheel to sow seeds of different crops. The shape design of the recesses is that the depth from the edge to the bottommost part gradually increases, and the maximum depth is consistent with the thickness of the seed to be sowed. The distance between two adjacent recesses on the same single line is designed according to an appropriate row spacing of the crop to be sowed. The recesses are arranged on single lines in multiple columns. All the single lines are parallel to each other. The number of the single lines and the distances between two adjacent single lines can be designed according to a seeding requirement.

By using the present disclosure, the seeding effect is ensured, and miss-seeding and no-loading are avoided. Furthermore, under the control of the caterpillar for transporting seeds, the seeding is more uniform and accurate. Moreover, external power can simultaneously control the whole machine to walk and the caterpillar for transporting seeds to move, so that the seeding effect is not affected by the walking speed, thereby further guaranteeing the seeding quality.

What is claimed is:

1. A precision seeding apparatus with recesses on a caterpillar for arranging and distributing seeds against bottoms of seed furrows, comprising a frame, wherein the frame is provided with a seed box with a seed distribution opening, wherein a caterpillar for transporting seeds capable of being connected with a drive mechanism is arranged in the seed box; a lower part of the caterpillar for transporting seeds corresponds to the position of the seed distribution opening; the caterpillar is provided with at least one column of recesses in a lengthwise direction of the caterpillar; each group of recesses is connected through a seed unloading ditch; the seed unloading ditch is formed into a ring in a lengthwise direction of the caterpillar for transporting seeds; the recess has a width greater than that of the seed unloading ditch and has the same depth as that of the seed unloading ditch; a lower part of the caterpillar for transporting seeds is provided with a comb sheet; and one edge of the comb sheet away from the seed unloading ditch is fixed on a rear wallboard of the seed box.

2. The precision seeding apparatus with the recesses on the caterpillar for arranging and distributing seeds against the bottoms of the seed furrows according to claim 1, wherein the frame is provided with a supplementary seed box, and a supplementary seed tube at a lower end of the supplementary seed box is led to a lower part of a downstream side of the caterpillar.

3. The precision seeding apparatus with the recesses on the caterpillar for arranging and distributing seeds against the bottoms of the seed furrows according to claim 2, wherein the supplementary seed box is located in the seed box, and an opening in an upper end of the supplementary seed box is located in the middle or lower part of the seed box.

4. The precision seeding apparatus with the recesses on the caterpillar for arranging and distributing seeds against the bottoms of the seed furrows according to claim 3, wherein a light reflection sheet is arranged at a lower bottom of each recess, and a corresponding photoelectric sensor is provided below the supplementary seed tube.

5. The precision seeding apparatus with the recesses on the caterpillar for arranging and distributing seeds against the bottoms of the seed furrows according to claim 3, wherein a seed clearing brush contacting a surface of the caterpillar is arranged above or below the supplementary seed tube.

6. The precision seeding apparatus with the recesses on the caterpillar for arranging and distributing seeds against the bottoms of the seed furrows according to claim 3, wherein the supplementary seed box and the caterpillar are arranged on two sides of the lower part of the seed box, and the caterpillar is inclined towards the seed distribution opening.

7. The precision seeding apparatus with the recesses on the caterpillar for arranging and distributing seeds against the bottoms of the seed furrows according to claim 3, wherein in two adjacent columns of recesses, a center point of any one recess in one column corresponds to a middle point of a gap between two adjacent recesses in the other column.

8. The precision seeding apparatus with the recesses on the caterpillar for arranging and distributing seeds against the bottoms of the seed furrows according to claim 3, wherein the bottom surface of each recess is an arc-shaped surface, and an outer edge is circular or elliptical or track-shaped.

9. The precision seeding apparatus with the recesses on the caterpillar for arranging and distributing seeds against the bottoms of the seed furrows according to claim 3, wherein one group of supplementary seed tubes is connected with the supplementary seed box; the number of supplementary seed tubes is the same as the number of columns of recesses; and an opening in a lower end of each supplementary seed tube corresponds to the position of one column of recesses, and is spaced away from the outer surface of the caterpillar by a distance that is half of the depth of the recess.

10. The precision seeding apparatus with the recesses on the caterpillar for arranging and distributing seeds against the bottoms of the seed furrows according to claim 2, wherein a light reflection sheet is arranged at a lower bottom of each recess, and a corresponding photoelectric sensor is provided below the supplementary seed tube.

11. The precision seeding apparatus with the recesses on the caterpillar for arranging and distributing seeds against the bottoms of the seed furrows according to claim 2, wherein a seed clearing brush contacting a surface of the caterpillar is arranged above or below the supplementary seed tube.

12. The precision seeding apparatus with the recesses on the caterpillar for arranging and distributing seeds against the bottoms of the seed furrows according to claim 2, wherein the supplementary seed box and the caterpillar are arranged on two sides of the lower part of the seed box, and the caterpillar is inclined towards the seed distribution opening.

13. The precision seeding apparatus with the recesses on the caterpillar for arranging and distributing seeds against the bottoms of the seed furrows according to claim 2, wherein in two adjacent columns of recesses, a center point of any one recess in one column corresponds to a middle point of a gap between two adjacent recesses in the other column.

14. The precision seeding apparatus with the recesses on the caterpillar for arranging and distributing seeds against the bottoms of the seed furrows according to claim 2, wherein the bottom surface of each recess is an arc-shaped surface, and an outer edge is circular or elliptical or track-shaped.

15. The precision seeding apparatus with the recesses on the caterpillar for arranging and distributing seeds against the bottoms of the seed furrows according to claim 2, wherein one group of supplementary seed tubes is connected with the supplementary seed box; the number of supplementary seed tubes is the same as the number of columns of recesses; and an opening in a lower end of each supplementary seed tube corresponds to the position of one column of recesses, and is spaced away from the outer surface of the caterpillar by a distance that is half of the depth of the recess.

16. The precision seeding apparatus with the recesses on the caterpillar for arranging and distributing seeds against the bottoms of the seed furrows according to claim 1, wherein a light reflection sheet is arranged at a lower bottom of each recess, and a corresponding photoelectric sensor is provided below the supplementary seed tube.

17. The precision seeding apparatus with the recesses on the caterpillar for arranging and distributing seeds against the bottoms of the seed furrows according to claim 1, wherein in two adjacent columns of recesses, a center point of any one recess in one column corresponds to a middle point of a gap between two adjacent recesses in the other column.

18. The precision seeding apparatus with the recesses on the caterpillar for arranging and distributing seeds against the bottoms of the seed furrows according to claim 1, wherein the bottom surface of each recess is an arc-shaped surface, and an outer edge is circular or elliptical or track-shaped.

* * * * *